April 10, 1934. L. IVERSEN 1,954,132
APPARATUS FOR SHEARING
Filed March 10, 1928
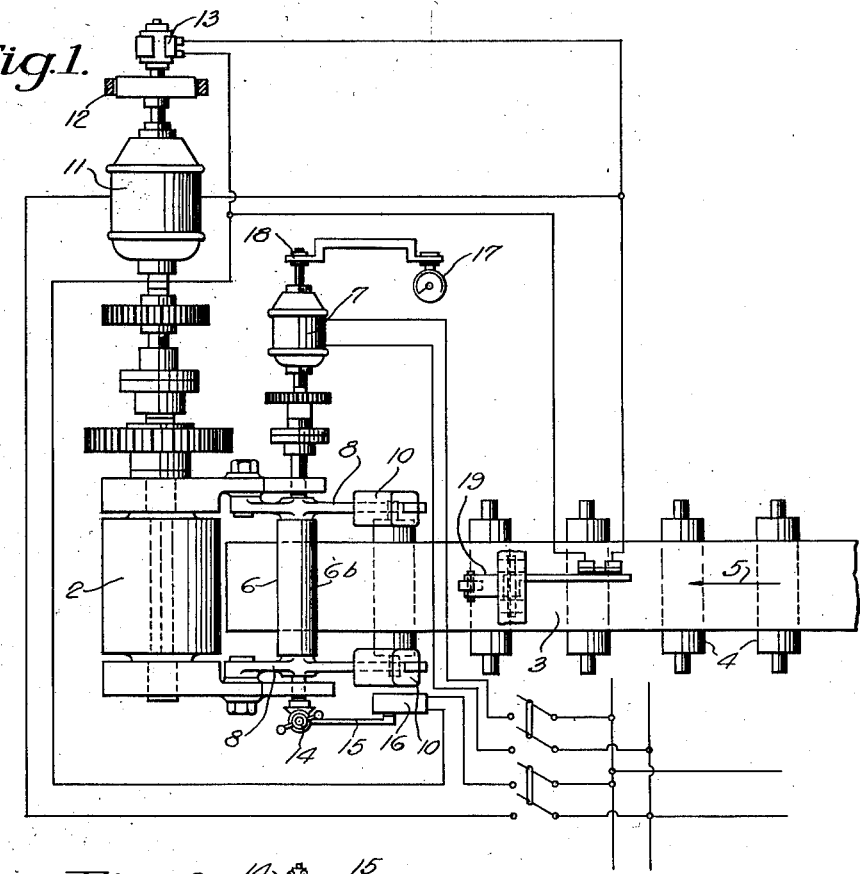
Fig.1.
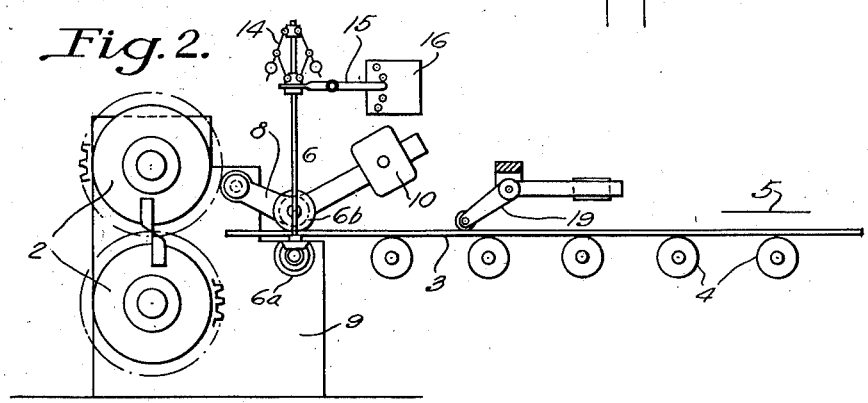
Fig.2.
Fig.3.
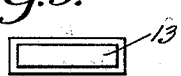
INVENTOR
Lorenz Iversen,
By Byrnes, Stebbins
& Parmelee,
His attorneys.

Patented Apr. 10, 1934

1,954,132

UNITED STATES PATENT OFFICE 1,954,132

APPARATUS FOR SHEARING

Lorenz Iversen, Pittsburgh, Pa., assignor to Mesta Machine Company, Pittsburgh, Pa., a corporation of Pennsylvania Application March 10, 1928, Serial No. 260,678

9 Claims. (Cl. 164—68)

The present invention relates broadly to the art of metal cutting, and more particularly to the art of cutting metal shapes, such as sheets and strips and the like, while moving.

Heretofore it has been customary in the art to which this invention relates to provide shearing means having the ability to attain an instantaneous cutting speed substantially equal to the speed of movement of the material being cut. These shears have usually been of the intermittent type, the shear being stopped and started for each shearing operation, although the material being cut moves continuously through the shears.

An important object of the present invention is to provide means whereby the cutting speed of the shear is regulated by the speed of the material to be sheared, whereby the sheared pieces may be cut to length very accurately.

Another object of the present invention is to provide a method and apparatus for shearing wherein a continuously operating shear, adapted to effect cutting operations periodically, is so controlled by the speed of the moving material to be sheared that a definite relation exists between the speed of the shears and the speed of the moving strip.

Another object of this invention is to provide means whereby the speed of the shear blades may be regulated relative to the speed of the material to be cut, so that the speed of the blades may be maintained more or less, or equal to the speed of the material.

A further object of this invention is to provide means whereby the length of the piece cut from a moving strip of material may be regulated by the speed of a flying shear relative to the speed of the moving piece to be sheared.

In the accompanying drawing, there is shown for purpose of illustration only, a preferred embodiment of my invention, it being understood that the drawing does not define the limits of the invention, as changes in the construction and operation disclosed therein may be made without departing either from the spirit of the invention or the scope of my broader claims.

In the drawing:

Figure 1 is a diagrammatic top plan view of a shearing apparatus embodying my invention;

Figure 2 is a side elevation of a portion of the apparatus shown in Figure 1; and Figure 3 is a development of the surface of the limit switch.

In carrying out the present invention, there may be provided a shear 2, adapted to receive material 3 delivered from a roll bed 4, the material being moved in the direction of the arrow 5. Interposed between the roll bed 4 and the shear 2 there may be provided a set of pinch rolls 6, adapted to yieldingly bear upon the material 3.

The lower pinch roll 6a may be driven by a motor 7 connected thereto. The upper pinch roll 6b is preferably mounted for vertical displacement through a slight distance by a mounting comprising a plurality of arms 8 attached to a stationary portion of the shear, such as frame 9. The pinch roll 6b is rotatably mounted on the arms 8, and is pressed downwardly toward the pinch roll 6a by suitable weights 10 carried on the outer ends of the arms 8. The shear 2 may be driven by a suitable motor 11, connected thereto, the motor shaft being provided with the usual brake 12 and limit switch 13, the limit switch being effective for stopping the shears in definite relation to the material after a cutting operation has been effected.

A definite relation between the peripheral speed of the pinch rolls 6 and the cutting speed of the shear 2 is preferably maintained through a governing device, such for example, as the mechanical governor 14, suitably connected to the pinch rolls 6 and to an arm 15, operating on the rheostat 16. Movement of the arm 15 results in a change of the current supplied to the motor 11, thereby changing the speed of the shear 2. It will thus be seen that a definite speed relation may be maintained between the shears, and the speed of the material to be cut, passing through the pinch rolls. By suitably adjusting the governor 14 and the rheostat 16 the change in current value occasioned by speed changes in the pinch rolls may be so regulated that the peripheral cutting speed of the shear 2 may be so changed as to maintain a predetermined relationship between the pinch roll speed and the shear speed. It is not necessary for the shear blades to travel at the same speed as the material being cut. It is evident that if the peripheral speed of the shear blades is the same as the speed of the material being cut, the strip will be cut into lengths equal to the distance the shear blades travel between successive cutting operations. It will also be apparent that if the material to be sheared moves faster or slower than the peripheral speed of the shear blades, the length of the material will be longer or shorter, respectively, than the distance through which the shear blades move between cutting operations.

It will thus be seen that my invention provides means whereby the speed of the blades can be regulated to be faster or slower, or equal to the speed at which the material 3 to be sheared is traveling.

When preparing to shear a predetermined length of material, the approximate delivery speed of the particular section is ascertained. The pinch rolls 6, rotated by the motor 7, are brought up to the desired speed, as may be indicated by a suitable tachometer 17, connected to a generator 18. The motor 7 continues to rotate, but it may be accelerated or decelerated by the frictional engagement between the pinch rolls 6 and material traversing them. As soon as the pinch rolls 6 have been adjusted to the desired speed, the rheostat 16 on the shearing motor 11 is set to give the desired relative speed between the shear blades and the pinch rolls. The shear is then ready for cutting.

A strip of material 3 to be cut is fed along the roll table 4 and strikes a flag 19, which is effective for starting the motor 11 and shear 2. The flag 19 may be connected in parallel circuit with the limit switch 13 and both in series with the motor 11. As is well understood in the art, the length of the first cut will be determined by the distance intervening between the flag 19 and the shear 2 and by the length of time required to bring the shear up to speed. The time required for a given acceleration of the shear is constant, and the distance the flag is located from the shear is variable, so the flag may be set so that the shear will always cut a fixed length from the leading end of the material 3, irrespective of the speed of the material being sheared. The shear continues to run and the material advances so that the material is cut into equal lengths until the flag 19 drops from the trailing end of the material and the limit switch 13 finally opens the motor circuit. As the motor circuit is broken at switch 13, arcing at the flag 19 is avoided.

As soon as the trailing end of the material passes the flag 19, and the limit switch 13 is open, the motor 11 stops, and because of the inter-connection between the flag 19 and the limit switch 13, it is possible to always stop the motor with the blades in a predetermined position, ready to be started for the next piece of material, and to cut a fixed length from the material before cutting the strip into the desired length.

As stated above, the shear may be adjusted for operation at approximately the delivery speed of the material 3, the regulation of the shear 2 being effected through the pinch rolls 6 operating the rheostat 16, which in turn controls the motor 11. The material 3 may, however, advance over the roll table 4 from the roll stand at different speed from that corresponding to the original setting of the pinch rolls 6. If this be the case, the pinch rolls 6 will adjust themselves to the delivery speed of the material, due to the pressure on the upper roll 6b by the weights 10 operating through the mechanical advantage obtained through the pivoted arms 8. As soon as the pinch rolls 6 change in speed from the original setting, the motor 11 and shears 2 will change speed also, due to the change effected in the governor 14, so that the predetermined relative speed between the pinch rolls and the shear will be maintained. It is obvious therefore, that the length of the pieces to be sheared will remain the same no matter whether the moving material 3 is traveling at the same speed as the original setting of the pinch rolls or not.

If it is desired to change the length of the cut pieces, this may be accomplished by merely adjusting the relationship between the governor 14 and the rheostat 16, whereby the speed relation between the pinch roll 6 and the shear 2 is altered as desired. In this manner, it is possible for the operator to change the length of the sheared pieces at any time while the shear is in operation.

It will be understood that the term "strip" as used herein is meant to include various sections and is not limited to sheets or bars.

While I have illustrated and described my invention as embodying the type of rotary shears described in my co-pending application, Serial No. 99,595, filed April 3, 1926, it will be understood that the invention is not limited to such shears, but may be used with any suitable type of flying shears.

Thus I provide an improved method and apparatus for shearing a moving strip, whereby lengths into which the strip is sheared may be varied while the shear is in operation.

A further advantage of my invention arises from the provision of means whereby the speed of flying shears may be maintained in a predetermined relationship with the speed of the piece being sheared.

Certain other advantages accrue to my invention by reason of the provision of method and apparatus whereby the operating speed of a flying shear may be correlated with the speed of travel of the strip to be sheared, whereby the lengths into which the strip is cut may be predetermined independently of the speed of travel of the strip.

I claim:

1. Apparatus for shearing a moving strip into lengths comprising a rotary shear, a motor for driving the shear, means for energizing the motor as long as a strip is in shearing position, pinch rolls for feeding strip to the shear and a speed control means for said motor driven from said pinch rolls.

2. In cutting apparatus of the kind described, a rotary shear for cutting moving material as fed thereto, a variable-speed motor for actuating the rotary shear, and means including a regulator device responsive to the speed of the moving material and operable by changes in said speed to control the speed of the shear-actuating motor.

3. In cutting apparatus of the kind described, in combination, a rotary shear disposed for cutting moving material as fed thereto into predetermined lengths, variable-speed means for driving the rotary shear, and means actuated in accordance with the speed of the moving material and operable on changes therein to automatically vary the speed of the shear-driving means to maintain a predetermined ratio between the speed of the rotary shear and the linear speed of the moving material fed thereto.

4. A flying cutter for operating on moving material, comprising a blade mounted for rotary movement and adapted to make cutting engagement with the material at a point in such movement, means for imparting rotary movement to said blade, said means being constituted to accelerate said blade to a peripheral speed substantially equal at the cutting point to the linear speed of the material, and means for automatically modifying the speed of operation of said first-named means to accord with varying speeds of linear movement of the material.

5. Apparatus for shearing a moving strip into lengths comprising a rotary shear, means for operating said shear continuously as long as the strip is in shearing position, and means responsive to the strip speed and effective to vary the speed of the shear operating means while in operation, in accordance with variations in the speed of travel of the strip.

6. Apparatus for shearing a strip into lengths comprising a rotary shear, means for operating said shear continuously as long as the strip is in shearing position, means for advancing the strip to the shearing apparatus, and means responsive to the strip speed and effective to vary the speed of the shear-operating means in accordance with the speed of travel of the strip.

7. Apparatus for shearing a moving piece of material into lengths comprising a rotary shear, a motor for driving the shear, means operated by the piece effective to start the motor, and speed control means for said motor responsive to the speed of the strip.

8. In a shearing apparatus, a rotary shear adapted to operate continuously, a drive for the shear permanently connected thereto, independent means for feeding strip to the shear, and means responsive to variations in the speed of the strip effective to vary correspondingly the speed of the shear drive.

9. In a shearing apparatus, a shear, a drive for the shear permanently connected thereto, independent strip-feeding means adjacent the shear, and speed control means for the shear drive operable in response to changes in the speed of the strip-feeding means.

LORENZ IVERSEN.